June 19, 1962 W. N. JONES 3,040,237
ELECTRICAL CONTROL APPARATUS
Filed Feb. 13, 1958

WITNESSES
John E. Hessley, Jr.
Clement L. McHale

INVENTOR
Wesley N. Jones
BY
F. E. Browder
ATTORNEY

United States Patent Office 3,040,237
Patented June 19, 1962

3,040,237
ELECTRICAL CONTROL APPARATUS
Wesley N. Jones, Severna Park, Md., assignor to Westinghouse Electric Corporation, East Pittsburgh, Pa., a corporation of Pennsylvania
Filed Feb. 13, 1958, Ser. No. 715,069
4 Claims. (Cl. 323—22)

This invention relates to electrical control apparatus and more particularly to regulator systems employing semiconductor devices.

A problem arises in providing protection for certain types of electrical control apparatus, such as regulator systems of the series type employing semiconductor devices, for controlling the current supplied to a load circuit from a source of direct current. This is because conventional protective means, such as a fuse or an overload relay, do not function quickly enough in the event of a large overload on the regulator system, such as results when a short circuit occurs in the load circuit whose current is controlled by the regulator system. Often semiconductor devices, such as transistors, employed in such a regulator system burn out or are destroyed before conventional protective means, such as a fuse or relay, stops the flow of current to the load circuit in which a short circuit has occurred. It is therefore desirable to provide control apparatus, such as a regulator system of the type just described, including means for protecting or limiting the power dissipation in the semiconductor devices when a short circuit occurs in the load circuit whose current is controlled by the regulator system.

It is an object of this invention to provide a new and improved regulator system employing semiconductor devices for maintaining an electrical quantity associated with an electrical circuit at a predetermined value.

A more specific object of this invention is to provide means for protecting semiconductor devices employed in a regulator system for maintaining an electrical quantity associated with an electrical circuit at a predetermined value when substantially a short circuit occurs in said circuit.

Other objects of the invention will, in part, be obvious and will, in part, appear hereinafter.

For a fuller understanding of the nature and objects of the invention, reference should be had to the following detailed description taken in connection with the accompanying drawings in which.

Figure 1:
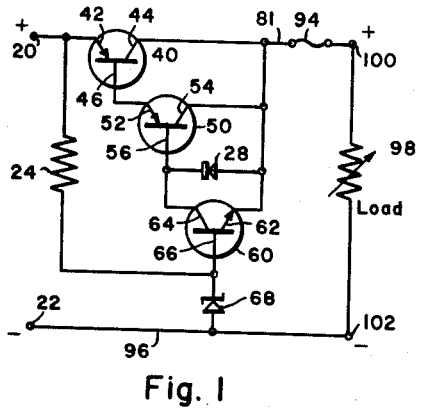
FIGURE 1 is a schematic diagram of circuits and apparatus illustrating one embodiment of this invention.

Referring now to the drawings and FIG. 1 in particular, there is illustrated a regulator system including two input terminals 20 and 22 at which current is supplied from an unregulated source of direct current (not shown). Current flows from the input terminals 20 and 22 through the emitter-collector path of the P-N-P transistor 40 which is connected in series with a load circuit, including a load 98 which may vary, and through a protective means, specifically the fuse 94. The emitter 42 of the transistor 40 is connected to the positive input terminal 20, and the collector 44 of the transistor 40 is connected to the positive terminal 100 of the load 98 through the fuse 94. The negative input terminal from the source of direct current is connected directly to the negative terminal 102 of the load 98 by the conductor 96. Most of the current which flows from the source of direct current to the load 98 flows through the emitter-collector path of the transistor 40.

Means is provided for controlling the current which flows in the emitter-collector path of the transistor 40 comprising the transistor 50 which is of the P-N-P type, a transistor 60 which is of the N-P-N type and a voltage reference device, specifically a semiconductor diode 68 of the P-N junction type, preferably of the type known to the art as a Zener diode. In particular, the semiconductor diode 68 is connected in series with a current limiting resistor 24, the series circuit being connected across the source of direct current at the input terminals 20 and 22 so that current flows through the semiconductor diode 68 in the reverse or high resistance direction. Therefore, the applied voltage across the semiconductor diode 68, which is above the critical breakdown of the diode 68, remains substantially constant, irrespective of variations in the voltage at the input terminals 20 and 22.

In order to control the current which flows in the collector 64 of the transistor 60, the difference in voltage between the voltage across the diode 68 and the voltage across the load 98 is applied between the base 66 and the emitter 62 of the N-P-N transistor 60. In particular, the diode 68 is connected between the base 66 of the transistor 60 and the negative terminal 102 of the load 98 through the conductor 96. The emitter 62 of the transistor 60 is connected to the positive terminal 100 of the load 98 through the fuse 94. The collector 64 of the transistor 60 is connected directly to the base 56 of the transistor 50 so that the current which flows in the collector 64 is the same as the current which flows in the base 56. In general, the transistor 50 is connected in circuit relationship with the transistor 60 as a directly coupled amplifier to amplify the current which flows in the collector 64 of the transistor 60. The collector 54 of the transistor 50 is connected to the positive terminal 100 of the load 98 through the fuse 94. The emitter 52 of the transistor 50 is connected directly to the base 46 of the transistor 40 so that the same current flows in the emitter 52 and the base 46. A semiconductor device, specifically a semiconductor diode 28 having a hyperconductive characteristic for certain applied voltages, is connected between the collector 64 and the emitter 62 of the transistor 60 for reasons which will be explained hereinafter.

The normal operation of the regulator system shown in FIG. 1, in the absence of a short circuit in the load circuit connected at the terminals 100 and 102, will be considered first. In general, the regulator system shown in FIG. 1 operates to control the flow of current from a source of direct current supplying current at the input terminals 20 and 22 to the load 98 to maintain the voltage at the terminals 100 and 102 at a predetermined value. As the voltage across the load 98 at the terminals 100 and 102 increases above its regulated value, the regulator system operates to reduce the flow of current to the load 98. When the voltage across the load 98 at the terminals 100 and 102 decreases to a value below its regulated value, the regulator system operates to increase the flow of current to the load 98.

The detailed operation of the regulator system shown in FIG. 1 will now be described. Current flows from the positive terminal 20 through the series path which includes the resistor 24 and the semiconductor diode 68 to the negative terminal 22. At the common terminal of the resistor 24 and the diode 68, a portion of the above current flows into the base 66 and out of the emitter 62 of the transistor 60, then through the fuse 94 to the positive terminal 100, back through the load 98 to the negative terminal 102 and then through the conductor 96 to the negative input terminal 22. The current which flows from the base 66 to the emitter 62 to the transistor 60 is amplified by the transistor 60. The amplified current flows from the positive terminal 20 into the emitter 42 and out of the base 46 of the transistor 40, into the emitter 52 and out of the base 56 of the transistor 50, into the collector 64 and out of the emitter 62 of the transistor 60, through the fuse 94 to the terminal 100 back through the load 98 to the terminal 102, and then through the conductor 96 to the negative input terminal 22. The current which flows from the emitter 52 to the base 56 of the transistor 50 functions as an input signal to the transistor 50 and is amplified by the transistor 50. The current amplified by the transistor 50 flows from the positive terminal 20 into the emitter 42 and out of the base 46 of the transistor 40, into the emitter 52 and out of the collector 50 and back to the negative terminal 22 through the fuse 94 and the load 98 in the manner just described. The current which flows from the emitter 42 to the base 46 of the transistor 40 functions as an input signal to the transistor 40 and is amplified by the transistor 40. The current amplified by the transistor 40 flows from the positive terminal 20 into the emitter 42 and out of the collector 44 of the transistor 40 and back to the negative terminal 22 through the fuse 94 and the load 98 in the manner just described. The current which flows from the emitter 42 to the collector 44 of the transistor 40 comprises most of the current supplied by the source of direct current at the terminals 20 and 22 which flows to the load 98.

In the normal range of operation of the regulator system shown in FIG. 1, the base 66 is always maintained at a voltage which is at least slightly positive with respect to the voltage at the emitter 62 of the transistor 60. As previously described, the voltage at the emitter 62 of the transistor 60 varies with the voltage at the positive terminal 100 of the load circuit. Since the voltage at the base 66 of the transistor 60 remains substantially constant, the current which flows from the base 66 to the emitter 62 varies with the voltage across the load 98. As previously described, the voltage between the base 66 and the emitter 62 of the transistor 60 is actually the difference between the voltage across the diode 68 and the voltage across the load 98. When the voltage across the load 98 increases to a value above its regulated value, the voltage at the emitter 62 of the transistor 60 becomes more positive with respect to the voltage at the base 66 of the transistor 60. Therefore, the current which flows from the base 66 to the emitter 62 of the transistor 60 decreases. This change in current is amplified in the current which flows in the collector 64 of the transistor 60, the change in the latter current, in turn, being amplified by the transistor 50 and the transistor 40, as previously described. Therefore, the current which flows in the emitter-collector path of the transistor 40 decreases until the voltage across the load 98 is reduced to its regulated value.

On the other hand, when the voltage across the load 98 decreases to a value below its regulated value, the voltage at the emitter 62 of the transistor 60 becomes less positive with respect to the voltage at the base 66 of the transistor 60, and the current which flows from the base 66 to the emitter 62 of the transistor 60 increases. This change in current is amplified in the current which flows in the collector 64 of the transistor 60 and is amplified in turn by the transistors 40 and 50, as previously described. Therefore, the current which flows in the emitter-collector path of the transistor 40 increases to thereby increase the voltage across the load 98 to its regulated value. In summary, the current which flows in the emitter-collector path of the transistor 40 reflects in amplified form any change in the current which flows from the base 66 to the emitter 62 of the transistor which is caused by a change in the voltage across the load 98 from its regulated value.

Figure 4:
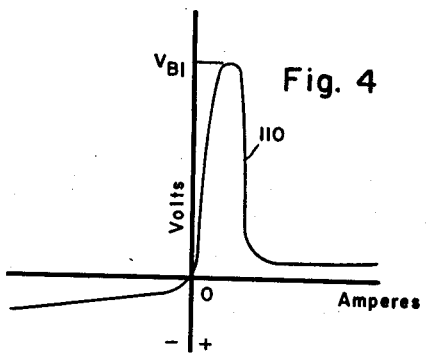
FIG. 4 is a graph illustrating the volt-ampere characteristic of the semiconductor diode shown in FIG. 1 which has a hyperconductive characteristic for certain applied voltages.

The hyperconductive semiconductor diode 28 and its effect on the operation of the regulator system shown in FIG. 1 will now be described. In general, the semiconductor diode 28 is a semiconductor device having a hyperconductive characteristic for applied voltages greater than a critical breakdown voltage. The semiconductor diode 28 will be of the type described in an abstract of an article entitled "The Dynistor Diode, a New Device For Power Control," by A. P. Kruper, found on pages 194 to 197, inclusive, of Control Engineering, volume 4, No. 7, July 1957 and in U.S. Patent 2,953,693 which was filed February 27, 1957, by J. Philips and which is assigned to the same assignee as the present application. The volt-ampere characteristic of the semiconductor diode 28 is shown by the curve 110 in FIG. 4. As illustrated, the diode 28 breaks down at applied voltages above a critical reverse voltage, $V_{B1}$, and passes into a hyperconductive region of its volt-ampere characteristic. The effective impedance or resistance across the diode 28 in the hyperconductive region is therefore relatively low.

The effect of the diode 28 on the operation of the regulator system shown in FIG. 1 will now be considered. If substantially a short circuit occurs in the load circuit connected to the terminals 100 and 102, the voltage across the load 98 will decrease to a negligible value. The voltage at the terminal 81 will then approach the voltage at the negative input terminal 22, and the voltage at the collector 64 of the transistor 60 will tend to increase to a value approaching the voltage at the input terminal 20. As the voltage at the collector 64 of the transistor 60 starts to rise, the voltage across the semiconductor 28 will also start to rise until the breakdown voltage of the diode 28 is reached. The diode 28 will then break down and pass into the hyperconductive region of its volt-ampere characteristic, thus effectivley reducing the resistance of the diode 28 to a relatively low value. The transistor 60 will be effectively shorted out since a relatively low resistance will be connected between the collector 64 and the emitter 62 of the transistor 60. The voltage at the collector 64 of the transistor 60 and the base 56 of the transistor 50 will then be reduced to a value approaching the voltage at the negative terminal 22. Since the emitter 52 of the transistor 50 will then become much more positive with respect to the voltage at the base 56 of the transistor 50, the transistor 50 will begin to carry saturation current between the emitter 52 and the collector 54 of the transistor 50. The effective resistance between the emitter 52 and the collector 54 of the transistor 50 will thus be reduced to a negligible value, the voltage at the emitter 52 of the transistor 50 and the base 46 of the transistor 40 will be reduced to a value approaching the voltage at the negative terminal 22. The emitter 42 of the transistor 40 will then become more positive with respect to the base 46 of the transistor 40, and the transistor 40 will start to carry saturation current from the emitter 42 to the collector 44 of the transistor 40. In summary, when a short circuit occurs in the load circuit connected at the terminals 100 and 102, the diode 28 will break down to thereby reduce to a relatively low value the effective voltage across each of the transistors 40 and 50 which will then begin to conduct current heavily. The diode 28 will therefore operate to reduce or limit the power dissipation in the transistors 40, 50 and 60 because of the low voltage across the transistors 40, 50 and 60 whenever a short circuit occurs in the load circuit connected at the terminals 100 and 102. The power dissipation in the transistors 40, 50 and 60, which is a product of the current and voltage associated with said transistors, will be limited to a safe value even though the transistors 40 and 50 are carrying saturation current because the diode 28 limits the voltage across said transistors to a relatively low value.

It has been found that a semiconductor device, such as the diode 28, operates or breaks down relatively fast compared to a conventional protective means, such as the fuse 94, when a short circuit occurs in a load circuit connected to a regulator system of the series type, employing semiconductor devices as shown in FIG. 1. A semiconductor device, such as the diode 28, therefore, functions to limit or reduce power dissipation in the semiconductor devices, specifically the transistors 40, 50 and 60 shown in FIG. 1, during the period after a short circuit occurs in the load circuit connected to the terminals 100 and 102 and before a conventional protective means, such as the fuse 94, opens when the current flow to the load circuit increases to a maximum predetermined value to thereby end current flow to the load circuit connected to the terminals 100 and 102.

Figure 2:
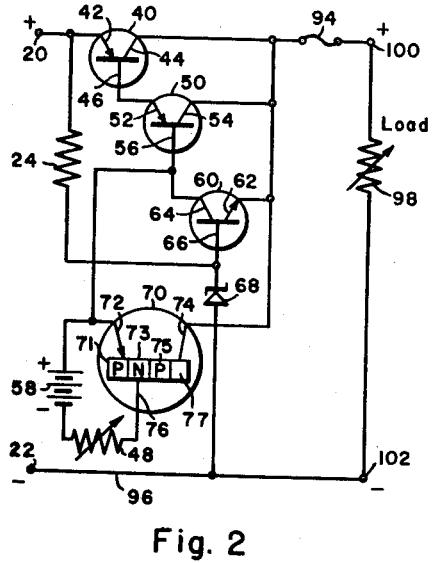
FIG. 2 is a schematic diagram of circuits and apparatus illustrating a second embodiment of this invention.

Referring now to FIG. 2, there is illustrated a regulator system which, in general, is similar to the regulator system shown in FIG. 1, except that a different type of semiconductor device, specifically a hyperconductive transistor 70, is substituted for the semiconductor diode 28 shown in FIG. 1. The reference numerals in FIG. 2 for the equipment which corresponds to the equipment in FIG. 1 are the same.

The transistor 70 comprises an emitter 71 of a semiconductor material having a first type of semiconductivity, a first base 73 of a semiconductor material having the opposite type of semiconductivity, a second base 75 of a semiconductor material of the first type of semiconductivity, a mass of metal 77 in intimate contact with the second base 75, an electrical ohmic connection 72 to the emitter 71, an electrical ohmic connection 76 to the first base 73, and an electrical ohmic connection 74 to the mass of metal 77. In general, the volt-ampere characteristic of the transistor 70 is similar to the volt-ampere characteristic of the semiconductor diode shown in FIG. 1 and illustrated by the curve 110 in FIG. 4, except that the critical breakdown voltage may be varied by applying a bias control current between the electrical connection 72 to the emitter 71 and the electrical connection 76 to the first base 73 of the transistor 70. The transistor 70 is described in more detail in copending application Serial No. 649,038, filed March 28, 1957, and assigned to the assignee of the present application.

In particular, the transistor 70 is connected in similar fashion to the semiconductor diode 28 between the collector 64 and the emitter 62 of the transistor 60. The electrical connection 72 to the emitter 71 of the transistor 70 is connected to the collector 64 of the transistor 60, and the electrical connection 74 to the mass of metal 77 of the transistor 70 is connected to the emitter 62 of the transistor 60. In order to apply a bias control current between the electrical connection 72 to the emitter 71 and the electrical connection 76 to the first base 73 of the transistor 70, a source of direct current 58 having a substantially constant output voltage is connected in series with a variable resistor 48 between the electrical connection 72 and the electrical connection 76 of the transistor 70. The value of the critical breakdown voltage applied between the electrical connection 72 and the electrical connection 74 of the transistor 70 may be varied by adjusting the resistance of the variable resistor 48 which controls the bias control current which flows from the electrical connection 72 to the electrical connection 76 of the transistor 70. The balance of the circuit shown in FIG. 2 is the same as the circuit shown in FIG. 1.

The normal operation of the regulator system shown in FIG. 2 is the same as the operation of the regulator system shown in FIG. 1. When a short circuit occurs in in the load circuit connected to the terminals 100 and 102 of the regulator system shown in FIG. 2, the transistor 70 breaks down in similar fashion to the diode 28 shown in FIG. 1 in order to reduce or limit the power dissipation in the transistors 40, 50 and 60 shown in FIG. 2. The advantage of the transistor 70 over the semiconductor diode 28 is that the breakdown voltage of the transistor 70 may be varied by adjusting the bias control current applied to the transistor 70 for a particular application.

Figure 3:
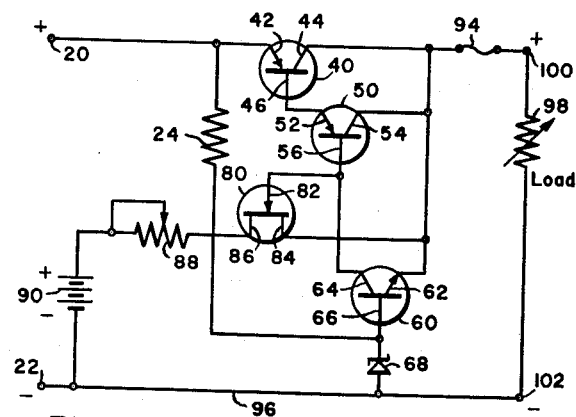
FIG. 3 is a schematic diagram illustrating a third embodiment of this invention.
Figure 5:
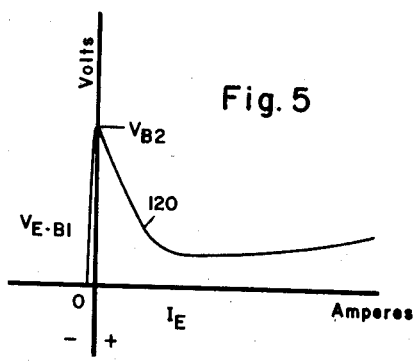
FIG. 5 is a graph illustrating the volt-ampere characteristic of the double-base diode shown in FIG. 3.

Referring now to FIG. 3, there is illustrated a regulator system similar to the regulator system shown in FIG. 1, except that a double-base diode 80 is substituted for the semi-conductor diode 28 shown in FIG. 1. The double-base diode 80 comprises an emitter 82, a first base connection 84 and a second base connection 86. The emitter 82 of the double-base diode 80 is connected to the collector 64 of the transistor 60, and the first base connection 84 of the diode 80 is connected to the emitter 62 of the transistor 60. The volt-ampere characteristic of the diode 80 for voltages applied between the emitter 82 and the first base connection 84 for a particular value of voltage at the second base connection 86 is illustrated in FIG. 5 by the curve 120. The voltage, $V_{E-B1}$, between the emitter 82 and the first base connection 84 is plotted on the vertical axis and the emitter current, $I_E$, is plotted on the horizontal axis. Above a critical applied breakdown voltage, $V_{B2}$, the volt-ampere characteristic of the diode 80 includes a hyperconductive or saturation region in which the effective impedance or resistance between the emitter 82 and the first base connection 84 is reduced to a relatively low value. In order to vary the breakdown voltage $V_{B2}$ of the diode 80, a source of direct current 90 having a substantially constant output voltage is connected in series with a variable resistor 88 between the negative input terminal 22 and the second base connection 86 of the diode 80. In operation, the voltage at the emitter 82 is always positive with respect to the voltage at the first base connection 84, and the voltage at the second base connection 86 is always positive with respect to the voltage at the first base connection 84. It has been found that when the voltage between the emitter 82 and the first base connection 84 reaches a particular portion of the voltage between the first base connection 84 and second base connection 86, the diode 80 will break down between the emitter 82 and the first base connection 84.

The normal operation of the regulator system shown in FIG. 3 is the same as the normal operation of the regulator system shown in FIG. 1. When a short circuit occurs in the load circuit connected at the terminals 100 and 102, the diode 80 breaks down between the emitter 82 and the first base connection 84 to thereby reduce or limit the power dissipation in the transistors 40, 50 and 60 in a manner similar to that described for the semiconductor diode 28 in the regulator system shown in FIG. 1. The advantage of the double-base diode 80 over the semiconductor diode 28 shown in FIG. 1 is that the critical breakdown voltage associated with the diode 80 may be varied by adjusting the voltage at the second base connection 86.

It is to be noted that, in the regulator systems shown in FIGS. 1, 2 and 3, the voltage across the constant voltage device, specifically the semiconductor diode 68, must always be at least slightly greater than the voltage across the load 98. It is to be understood that the value of the regulated voltage across the load 98 may be varied by connecting a plurality of semiconductor diodes such as the diode 68 in series between the base 66 of the transistor 60 and the negative terminal 102 of the load circuit. It is obvious also that other types of voltage references or constant voltage devices, such as a gas filled voltage regulating tube, may be substituted for the semiconductor diode 68 shown in FIGS. 1, 2 and 3.

It is to be understood that the transistor 50 shown in FIGS. 1, 2 and 3 could be eliminated in a particular application by connecting the collector 64 of the transistor 60 directly to the base 46 of the transistor 40 with the semiconductor device, having a hyperconductive characteristic for certain applied voltages, still connected between the collector 64 and the emitter 62 of the transistor 60. It is also to be understood that a regulator system embodying the teachings of this invention could be provided with a single transistor of the N-P-N type with the collector connected to the positive unit terminal 20, the emitter connected to the positive terminal 100 and the base connected to the common terminal of the resistor 24 and the semiconductor diode 68. The semiconductor device, having a hyperconductive characteristic for certain applied voltages, would then be connected between the collector and emitter of the single transistor of the N-P-N type. It is obvious that a regulator system embodying the teachings of this invention could be provided to maintain the current supplied to a load circuit at a predetermined value. The regulator systems shown in FIGS. 1, 2 and 3 could be modified for the latter case by adding an additional resistor in series with the load circuit and connecting the base 66 and the emitter 62 to be responsive to the difference in voltage between the voltage across the semiconductor diode 68 and the voltage across the additional resistor.

It has been found that a regulator system as illustrated in FIG. 3 including a double-base diode has a special advantage if the input voltage at the terminals 20 and 22 increases to an excessively high value. The double-base diode 80 does not break down as might be expected, but shunts sufficient current around the transistors 40 and 50 to prevent the applied voltage and the corresponding power dissipation in the transistors 40 and 50 from increasing to such a value as to damage the transistors 40 and 50. The reason for this operation is that there is a small range in the volt-ampere characteristic of the diode 80 near the breakdown voltage in which the current through the diode 80 increases without a corresponding change in the voltage across the diode 80.

The apparatus embodying the teachings of this invention has several advantages. Static means is provided to protect a control apparatus, such as a regulator system of the series type employing semiconductor devices, from overcurrents which might result from a short circuit in a load circuit whose current or voltage is maintained at a predetermined value by the regulator system. In addition, the semiconductor devices employed to protect other semiconductor devices, such as transistors in a regulator system of the series type, are relatively fast acting compared to conventional protective means, such as fuses or overload relays used to protect regulator systems of the type described against overloads or overcurrents.

Since numerous changes may be made in the above-described apparatus and circuits, and different embodiments of the invention may be made without departing from the spirit thereof, it is intended that all the matter contained in the foregoing description or shown in the accompanying drawings shall be interpreted as illustrative and not in a limiting sense.

I claim as my invention:

1. In combination, a source of direct current having a positive and a negative terminal, a load circuit having two terminals, first and second transistors each having a collector, an emitter and a base, means for connecting the emitter of said first transistor to the positive terminal of said source, means connecting the collector of said first transistor to one terminal of said load circuit, means connecting the negative terminal of said source to the other terminal of said load circiut, a resistor, a P–N junction diode, means connecting said resistor and said diode in series across the terminals of said source, said diode being connected to conduct current in the reverse direction, means connecting the base of said second transistor to the common terminal of said resistor and said diode, means connecting the base of said first transistor to the collector of said second transistor, means connected between the emitter and the base of said second transistor for applying between said emitter and said base the difference between the voltage across said load terminals and the voltage across said diode to control the current supplied to said load circuit by said source and a semiconductor device having a hyperconductive characteristic above a critical applied voltage connected between the collector and the emitter of said second transistor to break down and cause saturation current to flow in said first transistor to thereby limit the power dissipation in said transistors when substantially a short circuit occurs in said load circuit, the voltage across said device in its hyperconductive characteristic being much lower than said critical voltage, said semiconductor device comprising a hyperconductive diode.

2. In combination, a source of direct current having a positive and a negative terminal, a load circuit having two terminals, first and second transistors each having a base, an emitter and a collector, means connecting the emitter of said first transistor to the positive terminal of said source, means connecting the collector of said first transistor to one terminal of said load circuit, means connecting the negative terminal of said source to the other terminal of said load circuit, a resistor, a P–N junction diode, means connecting said resistor and said diode in series across said terminals of said source, said diode being connected to conduct current in the reverse direction, means connecting the base of said second transistor to the common terminal of said resistor and said diode, means connecting the base of said first transistor to the collector of said second transistor, means connected between the base and the emitter of said second transistor for applying between said base and emitter the difference between the voltage across said load terminals and the voltage across said diode to control the current supplied to said load circuit by said source, and a semiconductor device having a hyperconductive characteristic above a critical applied voltage connected between the collector and emitter of said second transistor to break down and cause saturation current to flow in said first transistor to thereby limit the voltage across and the power dissipation in each of said transistors when substantially a short circuit occurs in said load circuit and the voltage between the emitter and the collector of said second transistor starts to rise, the voltage across said device in its hyperconductive characteristc being much lower than said critical voltage.

3. In combination, a source of direct current having a positive and a negative terminal, a load circuit having two terminals, first and second transistors each having a base, an emitter and a collector, means connecting the emitter of said first transistor to the positive terminal of said source, means connecting the collector of said first transistor to one terminal of said load circuit, means connecting the negative terminal of said source to the other terminal of said load circuit, a resistor, a P–N junction diode, means connecting said resistor and said diode in series across said terminals of said source, said diode being connected to conduct current in the reverse direction, means connecting the base of said second transistor to the common terminal of said resistor and said diode, means connecting the base of said first transistor to the collector of said second transistor, means connected between the base and the emitter of said second transistor for applying between said base and emitter the difference between the voltage across said load terminals and the voltage across said diode to control the current supplied to said load circuit by said source, and a semiconductor device having a hyperconductive characteristic above a critical applied voltage connected between the collector and emitter of said second transistor to break down and cause saturation current to flow in said first transistor to thereby limit the voltage across and the power dissipation in each of said transistors when substantially a short circuit occurs in said load circuit and the voltage between the emitter and the collector of said second transistor starts to rise, the voltage across said device in its hyperconductive characteristic being much lower than said critical voltage, said semiconductor device comprising a hyperconductive transistor.

4. In combination, a source of direct current having a positive and a negative terminal, a load circuit having two terminals, first and second transistors each having a base, an emitter and a collector, means connecting the emitter of said first transistor to the positive terminal of said source, means connecting the collector of said first transistor to one terminal of said load circuit, means connecting the negative terminal of said source to the other terminal of said load circuit, a resistor, a P-N junction diode, means connecting said resistor and said diode in series across said terminals of said source, said diode being connected to conduct current in the reverse direction, means connecting the base of said second transistor to the common terminal of said resistor and said diode, means connecting the base of said first transistor to the collector of said second transistor, means connected between the base and the emitter of said second transistor for applying between said base and emitter the difference between the voltage across said load terminals and the voltage across said diode to control the current supplied to said load circuit by said source, and a semiconductor device having a hyperconductive characteristic above a critical applied voltage connected between the collector and emitter of said second transistor to break down and cause saturation current to flow in said first transistor to thereby limit the voltage across and the power dissipation in each of said transistors when substantially a short circuit occurs in said load circuit and the voltage between the emitter and the collector of said second transistor starts to rise, the voltage across said device in its hyperconductive characteristic being much lower than said critical voltage, said semiconductor device comprising a double base diode.

References Cited in the file of this patent

UNITED STATES PATENTS

| 2,832,035 | Bruck et al. | Apr. 22, 1958 |
| 2,832,900 | Ford | Apr. 29, 1958 |
| 2,855,524 | Shockley | Oct. 7, 1958 |

OTHER REFERENCES

"Double Base Expands Diode Applications," J. J. Suran, Electronics, March 1955, pages 198–202.

"Design Considerations for Semi Conductor Regulated Power Supplies," Sherr and Levy, Electronic Design, July 15, 1956, pages 22–25.